United States Patent
Xu et al.

(10) Patent No.: US 12,460,142 B1
(45) Date of Patent: Nov. 4, 2025

(54) SYSTEMS FOR PEAK SHAVING WITH COUPLED SURPLUS ENERGY UTILIZATION AND SOLID WASTE TREATMENT

(71) Applicant: GUANGDONG OCEAN UNIVERSITY, Guangdong (CN)

(72) Inventors: Qing Xu, Zhanjiang (CN); Shengxian Xian, Zhanjiang (CN); Jiayi Shao, Zhanjiang (CN); Zhisi Yang, Zhanjiang (CN); Ye Xie, Zhanjiang (CN); Zijie Yin, Zhanjiang (CN); Dongxue Yao, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 19/220,017

(22) Filed: May 27, 2025

Related U.S. Application Data

(63) Continuation of application No. PCT/CN2025/083616, filed on Mar. 20, 2025.

(30) Foreign Application Priority Data

Sep. 28, 2024 (CN) .......................... 202411363935.6

(51) Int. Cl.
  *B01J 6/00* (2006.01)
  *C10B 53/00* (2006.01)
  *C10J 3/66* (2006.01)
(52) U.S. Cl.
  CPC ................. *C10J 3/66* (2013.01); *B01J 6/008* (2013.01); *C10B 53/00* (2013.01);
(Continued)

(58) Field of Classification Search
  CPC .... C10J 3/66; C10J 2200/09; C10J 2200/152; C10J 2300/1269; C10J 2300/1284;
(Continued)

(56) References Cited

U.S. PATENT DOCUMENTS

2010/0281878 A1* 11/2010 Wormser ................. C10J 3/482
  110/342

FOREIGN PATENT DOCUMENTS

CN  101909741 B  *  6/2013  ............ B01J 19/126
CN  103742211 A   4/2014
(Continued)

OTHER PUBLICATIONS

CN-101909741B (Year: 2025).*
(Continued)

*Primary Examiner* — Huy Tram Nguyen
(74) *Attorney, Agent, or Firm* — PORUS IP LLC

(57) ABSTRACT

A system for peak shaving with coupled surplus energy utilization and solid waste treatment is provided. The system includes a solar concentrating tower provided with a heat absorber, a gasifier, a gas storage tank, a tar storage mechanism, and a microwave pyrolysis device. The heat absorber configured to supply heat to the gasifier. The gasifier is configured to pyrolyze solid waste into primary combustible gas, pyrolysis oil, and pyrolysis char. The gas storage tank is in fluid communication with the gasifier and configured to collect the primary combustible gas. The tar storage mechanism is in fluid communication with the gasifier and configured to store the pyrolysis oil and the pyrolysis char. The microwave pyrolysis device is powered by a thermal power generation unit. The microwave pyrolysis device is configured to pyrolyze the pyrolysis oil and the pyrolysis char into secondary combustible gas, which is collected into the gas storage tank.

6 Claims, 3 Drawing Sheets

(52) U.S. Cl.
CPC ...... *C10J 2200/09* (2013.01); *C10J 2200/152* (2013.01); *C10J 2300/1269* (2013.01); *C10J 2300/1284* (2013.01); *C10J 2300/1671* (2013.01); *C10J 2300/1693* (2013.01)

(58) Field of Classification Search
CPC ........ C10J 2300/1671; C10J 2300/1693; B01J 6/008; C10B 53/00
USPC ......................................................... 422/109
See application file for complete search history.

(56) References Cited

FOREIGN PATENT DOCUMENTS

| CN | 205295250 U | * | 6/2016 |
| CN | 206940809 U | | 1/2018 |
| CN | 107699287 A | | 2/2018 |
| CN | 207674430 U | | 7/2018 |
| CN | 112500871 A | | 3/2021 |
| CN | 114075442 A | | 2/2022 |
| CN | 116105117 A | | 5/2023 |
| CN | 116146983 A | | 5/2023 |
| CN | 116162498 A | | 5/2023 |
| CN | 116240040 A | | 6/2023 |
| CN | 118316125 A | | 7/2024 |
| CN | 221544504 U | | 8/2024 |
| CN | 118997877 A | | 11/2024 |
| KR | 20230059900 A | | 5/2023 |
| WO | 2019080809 A1 | | 5/2019 |

OTHER PUBLICATIONS

CN-205295250U (Year: 2025).*
First Office Action in Chinese Application No. 202411363935.6 mailed on Jan. 9, 2025, 11 pages.
Decision to Grant a Patent in Chinese Application No. 202411363935.6 mailed on Jan. 27, 2025, 4 pages.
Liu, Letong, Experimental Study and Mechanism Analysis of Catalytic Pyrolysis of Corn Stalk to Produce Hydrogen-Rich Gas, CNKI, 2023, 86 pages.

* cited by examiner

SYSTEMS FOR PEAK SHAVING WITH COUPLED SURPLUS ENERGY UTILIZATION AND SOLID WASTE TREATMENT

CROSS-REFERENCE TO RELATED APPLICATIONS

This application is a Continuation of International Application No. PCT/CN2025/083616, filed on Mar. 20, 2025, which claims priority to Chinese Patent Application No. 202411363935.6, filed on Sep. 28, 2024, the entire contents of each of which are hereby incorporated by reference.

TECHNICAL FIELD

The present disclosure relates to the technical field of energy storage and the solid waste treatment, and in particular, to a system for peak shaving with coupled surplus energy utilization and solid waste treatment.

BACKGROUND

Utilizing solid waste to produce a combustible gas represents an effective approach for energy recovery and environmental protection, demonstrating particular potential in valley filling and peak shaving. The conversion of the solid waste into the combustible gas not only reduces waste accumulation and environmental pollution, but also provides flexible energy supplementation. This facilitates energy storage during off-peak electricity demand periods and energy release during peak electricity demand periods, thereby contributing to stable power system operation.

Current pyrolysis systems predominantly employ a solar-thermal coupled biomass pyrolysis device. For example, CN116240040A discloses a self-driven solar-thermal system for biomass pyrolysis that operates without complete reliance on solar energy.

Apart from the solar-thermal coupled biomass pyrolysis device, alternative approaches include vertical microwave pyrolysis to enhance gas yield, as described in CN116162498A, where microwave pyrolysis under inert atmosphere enables vertical solid-liquid separation to improve gas production. Additionally, the study *Experimental Research and Mechanism Analysis of Catalytic Pyrolysis of Corn Stover for Hydrogen-Rich Gas Production* proposes enhancing solar-thermal pyrolysis efficiency through elevated temperatures and catalyst incorporation.

The above pyrolysis devices exhibit the following limitations:

(1) While a self-driven solar-thermal system may operate without full solar dependence, its insufficient production capacity renders the system inadequate for large-scale solid waste processing.

(2) Conventional vertical microwave pyrolysis requires single-stage processing at 1000° C.-1100° C. for complete pyrolysis, resulting in high power consumption, low energy efficiency, and suboptimal gas conversion rates.

In view of the above, developing a pyrolysis device capable of partially or fully overcoming these limitations represents a critical technical challenge requiring urgent attention in the field.

SUMMARY

One or more embodiments of the present disclosure provide a system for peak shaving with coupled surplus energy utilization and solid waste treatment. The system comprises a solar concentrating tower provided with a heat absorber, a gasifier, a gas storage tank, a tar storage mechanism, a microwave pyrolysis device, and a preprocessing chamber. The heat absorber is configured to supply heat to the gasifier. The gasifier is configured to pyrolyze solid waste into primary combustible gas, pyrolysis oil, and pyrolysis char. The gas storage tank is in fluid communication with the gasifier and configured to collect the primary combustible gas. The tar storage mechanism is in fluid communication with the gasifier and configured to store the pyrolysis oil and the pyrolysis char. A feed end of the microwave device is in fluid communication with the tar storage mechanism. The microwave pyrolysis device is powered by a thermal power generation unit, and configured to pyrolyze the pyrolysis oil and the pyrolysis char into secondary combustible gas. The secondary combustible gas is collected into the gas storage tank. The heat absorber supplies heat to the preprocessing chamber. The preprocessing chamber preheats the solid waste at a temperature in a range from 100° C. to 200° C., and preheated solid waste is transferred by a first conveyor belt device to the gasifier. The gasifier includes a furnace body, a stirring device, a heating assembly, and a gas inlet pipe. A side of the furnace body is provided with a feed opening connected to the first conveyor belt device. The stirring device is provided at a bottom of the gasifier. The heating assembly is disposed on an inner surface of the gasifier and heated by the heat absorber. The gas inlet pipe is in fluid communication with the furnace body and configured to deliver inert gas and carbon dioxide gas into the furnace body. The solid waste is pyrolyzed in the furnace body into the primary combustible gas, the pyrolysis oil, and the pyrolysis char, which are sequentially distributed from top to bottom. A first gas collection pipe is provided in a region of the furnace body where the primary combustible gas is distributed, and the first gas collection pipe is in fluid communication with the gas storage tank. A tar collection mechanism is provided in a region of the furnace body where the pyrolysis oil and the pyrolysis char are distributed. The tar collection mechanism is in fluid communication with the tar storage mechanism. The tar storage mechanism includes a pyrolysis char storage chamber and an oil storage tank. The tar collection mechanism includes an oil outlet pipe and a second conveyor belt device. The oil outlet pipe is configured to collect the pyrolysis oil from the furnace body to the oil storage tank. The second conveyor belt device is configured to collect the pyrolysis char from the furnace body to the pyrolysis char storage chamber. The pyrolysis char storage chamber and the oil storage tank are in fluid communication with the microwave pyrolysis device. The system further comprises a fuel cell station, and the gas storage tank transfers the primary combustible gas and the secondary combustible gas to the fuel cell station.

BRIEF DESCRIPTION OF THE DRAWINGS

To provide clearer illustration of the technical solutions in the embodiments of the present disclosure or the prior art, the accompanying drawings required for the embodiments will be briefly described below. It is apparent that the drawings in the following description represent only some embodiments of the present disclosure, and those skilled in the art may obtain other drawings based on these illustrations without creative effort.

Figure 1:
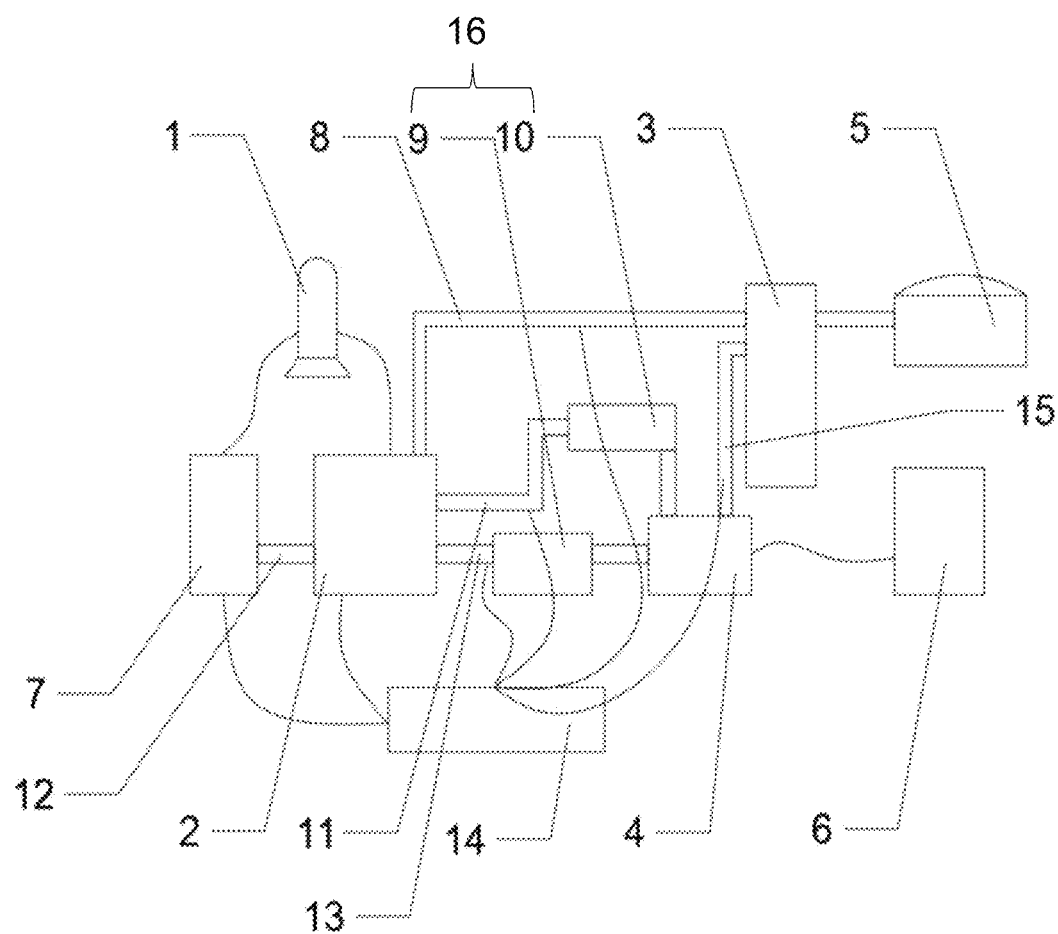
FIG. 1 is a schematic diagram of a system for peak shaving with coupled surplus energy utilization and solid waste treatment according to some embodiments of the present disclosure.

References in the drawings: 1, a solar concentrating tower; 2, a gasifier; 201, a furnace body; 202, a stirring device; 203, a heating assembly; 204, a gas inlet pipe; 3, a gas storage tank; 4, a microwave pyrolysis device; 5, a fuel cell station; 6, a thermal power generation unit; 7, a preprocessing chamber; 8, a first gas collection pipe; 9, pyrolysis char storage chamber; 10, an oil storage tank; 11, an oil outlet pipe; 12, a first conveyor belt device; 13, a second conveyor belt device; 14, a heat-collecting mechanism; and 15, a second gas collection pipe.

DETAILED DESCRIPTION

The technical solutions in the embodiments of the present disclosure will be clearly and completely described below in conjunction with the accompanying drawings in the embodiments of the present disclosure, and it is clear that the embodiments described are only a portion of the embodiments of the present invention and not all of the embodiments. Based on the embodiments in the present disclosure, all other embodiments obtained by a person of ordinary skill in the art without making creative labor fall within the scope of protection of the present disclosure.

In order to make the above purposes, features and advantages of the present disclosure more apparent and understandable, the following description is given in further detail in conjunction with the accompanying drawings and specific embodiments.

FIG. 1 is a schematic diagram of a system for peak shaving with coupled surplus energy utilization and solid waste treatment according to some embodiments of the present disclosure.

In some embodiments, as shown in FIG. 1, the system for peak shaving with coupled surplus energy utilization and solid waste treatment (hereinafter referred to as the system) may include: a solar concentrating tower 1, a gasifier 2, a gas storage tank 3, a tar storage mechanism 16, and a microwave pyrolysis device 4. The solar concentrating tower 1 is provided with a heat absorber (not shown in the drawings) configured to supply heat to the gasifier 2. The gasifier 2 is configured to pyrolyze solid waste into primary combustible gas, pyrolysis oil, and pyrolysis char. The gas storage tank 3 is in fluid communication with the gasifier 2 and configured to collect the primary combustible gas. The tar storage mechanism 16 is in fluid communication with the gasifier 2 and configured to store the pyrolysis oil and the pyrolysis char. A feed end of the microwave pyrolysis device 4 is in fluid communication with the tar storage mechanism 16. The microwave pyrolysis device 4 is powered by a thermal power generation unit 6. The microwave pyrolysis device 4 is configured to pyrolyze the pyrolysis oil and the pyrolysis char into secondary combustible gas. The secondary combustible gas is collected into the gas storage tank 3.

In some embodiments, a pyrolysis temperature of the gasifier 2 is in a range from 500° C. to 600° C., and a pyrolysis temperature of the microwave pyrolysis device 4 is in a range from 1000° C. to 1100° C.

The solar concentrating tower 1 refers to a device that utilizes the heat absorber to gather solar energy and generate thermal energy. In some embodiments, the solar concentrating tower 1 may provide the thermal energy to the gasifier 2 and a preprocessing chamber 7 in the system.

The heat absorber refers to a device for absorbing and converting the solar energy into the thermal energy. In some embodiments, the heat absorber is mounted in the solar concentrating tower 1.

The gasifier 2 refers to a high-temperature pyrolysis device for converting the solid waste into combustible gas, fuel oil, and coke.

In some embodiments, the heat absorber may transfer heat to the gasifier 2 through manners such as heat conduction, heat convection, heat radiation, or the like to achieve heat supply.

In some embodiments, the solid waste may include combustible waste such as household garbage, agricultural waste, industrial waste, or the like.

The primary combustible gas refers to combustible gas produced by pyrolysis of the solid waste in the gasifier. In some embodiments, the primary combustible gas may include combustible gas component such as methane, hydrogen, carbon monoxide, or the like.

The pyrolysis oil refers to liquid organic matter produced by pyrolysis of the solid waste in the gasifier 2. In some embodiments, the pyrolysis oil may include components such as tar, long chain hydrocarbons, or the like.

The pyrolysis char refers to solid state residue produced by pyrolysis of the solid waste in the gasifier 2. In some embodiments, the pyrolysis char may include solid substances such as carbonaceous residue, ash, or the like.

In some embodiments, the gasifier 2 may pyrolyze the solid waste at a predetermined temperature for a predetermined duration. The predetermined temperature is in a range from 500° C. to 600° C., and the predetermined duration may be preset based on a weight and a composition of the solid waste.

The gas storage tank 3 refers to a container for storing gas. In some embodiments, the gas storage tank 3 is in fluid communication with the gasifier 2 via a first gas collection pipe 8. In some embodiments, the gas storage tank 3 may be configured to collect the primary combustible gas and the secondary combustible gas.

The tar storage mechanism refers to a device for storing the pyrolysis oil and the pyrolysis char. In some embodiments, the tar storage mechanism 16 and the gasifier 2 may be in fluid communication with each other via a connecting device such as a pipe, or the like. In some embodiments, the pyrolysis oil and the pyrolysis char generated by the pyrolysis of the solid waste in the gasifier 2 may be transferred to the tar storage mechanism 16 for storage via the connecting device.

The microwave pyrolysis device 4 refers to a device that utilizes microwave energy to perform a pyrolysis reaction. The microwave pyrolysis device 4 is configured to pyrolyze the pyrolysis oil and the pyrolysis char into the secondary combustible gas. In some embodiments, the microwave pyrolysis device 4 may include a gravity sensor. More on the gravity sensor can be found below.

In some embodiments, the microwave pyrolysis device 4 and the tar storage mechanism 16 may be connected via a transmission device such as a pipe. In some embodiments, the microwave pyrolysis device 4 and the gas storage tank 3 may be connected via a second gas collection pipe 15.

The thermal power generation unit 6 refers to an electricity-generating device that converts thermal energy produced by fuel combustion into electrical energy.

The secondary combustible gas refers to a combustible gas produced by pyrolysis of the pyrolysis oil and the pyrolysis char.

In some embodiments, the microwave pyrolysis device 4 may perform pyrolysis on the pyrolysis oil and the pyrolysis char at a predetermined temperature for a predetermined duration. The predetermined temperature may be set based on actual pyrolysis needs. In some embodiments, the predetermined temperature is in a range from 1000° C. to 1100° C., and the predetermined duration may be set based on a weight of the pyrolysis oil and the pyrolysis char. In some embodiments, the heavier the weight of the pyrolysis oil and the pyrolysis char, the longer the predetermined time. In some embodiments, the secondary combustible gas generated by the pyrolysis of the pyrolysis oil and the pyrolysis char may be transferred to the gas storage tank 3 for storage via the second gas collection pipe 15.

In some embodiments of the present disclosure, the solid waste treatment adopts a two-stage pyrolysis process including gasifier pyrolysis and microwave pyrolysis, wherein a pyrolysis temperature of the gasifier is in a range from 500° C. to 600° C., and a pyrolysis temperature of the microwave pyrolysis device is in a range from 1000° C. to 1100° C. Compared to conventional single-stage microwave pyrolysis, the system demonstrates reduced pyrolysis duration, lower energy consumption, and improved combustible gas conversion efficiency.

In some embodiments, the system may further include the preprocessing chamber 7. The heat absorber is configured to supply heat to the preprocessing chamber 7, and the preprocessing chamber 7 may be configured to preheating the solid waste at a temperature of 100-200° C. Preheated solid waste is transported by a first conveyor belt device 12 to the gasifier 2.

The preprocessing chamber 7 may remove moisture from the solid waste and change the solid waste into a dried state to facilitate subsequent pyrolysis.

In some embodiments of the present disclosure, a material used for energy storage is the solid waste, which is a renewable energy source that can reduce carbon emissions, and the energy is converted into chemical energy (e.g., the combustible gas) stored in the gas storage tank, enabling flexible response to electricity demands while utilizing off-peak valley electricity during minimal grid load. Compared to conventional battery-based energy storage, the system eliminates battery usage (avoiding lifespan limitations), reduces coal consumption during peak electricity demand period, optimizes energy mix, enhances solid waste recycling rates, and lowers operational costs.

The preprocessing chamber 7 refers to a device that preheats the solid waste to remove moisture. In some embodiments, the preprocessing chamber 7 and the gasifier 2 may be connected via the first conveyor belt device 12. The heat absorber supplies heat to the preprocessing chamber 7 in a manner similar to its heat supply to the gasifier 2. More descriptions regarding the supply of thermal energy to the gasifier 2 by the heat absorber may be found in related descriptions above.

The first conveyor belt device 12 refers to a mechanical device for transporting the solid waste.

In some embodiments, after preheating of the solid waste by the preprocessing chamber 7, the dried solid waste is transferred to the gasifier 2 by the first conveyor belt device 12.

Figure 2:
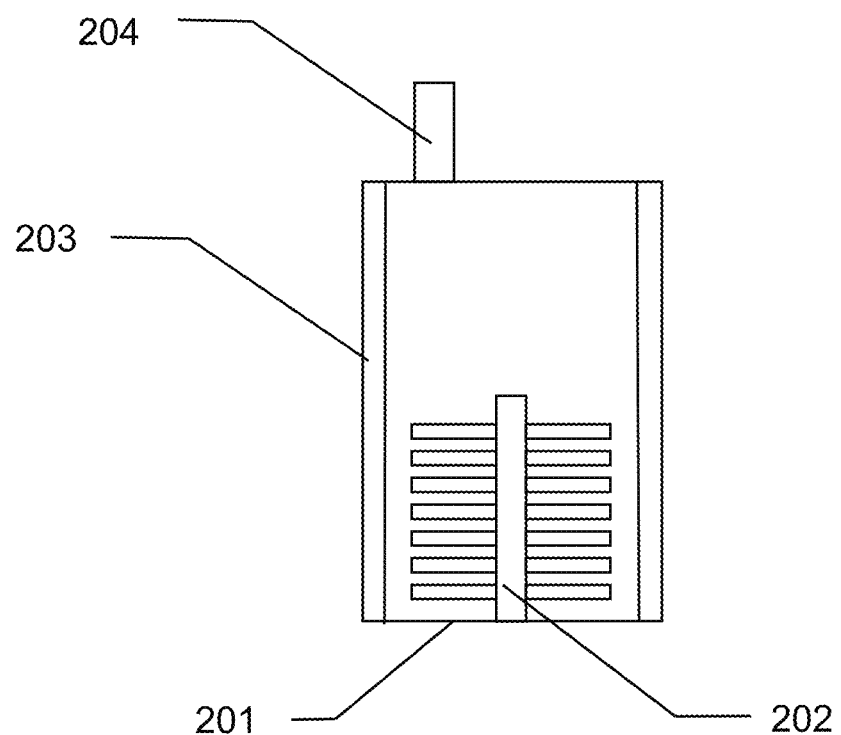
FIG. 2 is a schematic diagram of an interior of a gasifier according to some embodiments of the present disclosure.

FIG. 2 is a schematic diagram of an interior of a gasifier according to some embodiments of the present disclosure.

In some embodiments, as shown in FIG. 2, the gasifier 2 may include: a furnace body 201, a stirring device 202, a heating assembly 203, and a gas inlet pipe 204. A side of the furnace body 201 is provided with a feed opening in fluid communication with the first conveyor belt device. The stirring device 202 is provided at a bottom of the gasifier 2. The heating assembly 203 disposed on an inner surface of the gasifier 2 and heated by the heat absorber. The gas inlet pipe 204 in fluid communication with the furnace body 201 and configured to deliver inert gas and carbon dioxide gas into the furnace body 201. The solid waste is pyrolyzed in the furnace body 201 into the primary combustible gas, the pyrolysis oil, and the pyrolysis char distributed in order from top to bottom. A first gas collection pipe 8 is provided in a region of the furnace body 201 where the primary combustible gas is distributed, the first gas collection pipe 8 is in fluid communication with the gas storage tank 3, and a tar collection mechanism is provided in a region of the furnace body where the pyrolysis oil and the pyrolysis char are distributed. The tar collection mechanism is in fluid communication with the tar storage mechanism 16.

In some embodiments, the tar storage mechanism 16 includes a pyrolysis char storage chamber 9 and an oil storage tank 10. The tar collection mechanism includes an oil outlet pipe 11 and a second conveyor belt device 13. The oil outlet pipe 11 is configured to collect the pyrolysis oil from the furnace body 201 to the oil storage tank 10. The second conveyor belt device 13 is configured to collect the pyrolysis char from the furnace body 201 to the pyrolysis char storage chamber 9. The pyrolysis char storage chamber 9 and the oil storage tank 10 are in fluid communication with the microwave pyrolysis device 4.

The stirring device 202 refers to a mechanical device for stirring the solid waste. In some embodiments, the stirring device is disposed at a bottom of the furnace body 201, and configured to stir the solid waste continuously so that the solid waste is uniformly heated and fully reacted.

The heating assembly 203 refers to a device that releases heat to pyrolyze the solid waste. In some embodiments, the heating assembly is disposed on an inner surface of the furnace body 201.

The gas inlet pipe 204 refers to a device for delivering gas into the furnace body 201. In some embodiments, the gas inlet pipe may input the inert gas and the carbon dioxide gas into the furnace body 201. The inert gas may include nitrogen, helium, or the like.

In some embodiments, the primary combustible gas, being gaseous with a density lower than a density of the pyrolysis oil and a density of the pyrolysis char, is distributed in an uppermost layer of the furnace body 201. The pyrolysis oil, with a density higher than the density of the primary combustible gas and lower than the density of the pyrolysis char, is distributed in an intermediate layer of the furnace body 201. The pyrolysis char, with a density higher than the density of the primary combustible gas and the density of the pyrolysis oil, is distributed in a lowermost layer of the furnace body 201. Therefore, the primary combustible gas, the pyrolysis oil, and the pyrolysis char are distributed from top to bottom in the furnace body.

In some embodiments, the first gas collection pipe 8 is configured to transfer the primary combustible gas to the gas storage tank 3. The oil outlet pipe 11 is configured to transfer the pyrolysis oil to the oil storage tank 10. The second conveyor belt device 13 is configured to transfer the pyrolysis char to the pyrolysis char storage chamber 9. The first gas collection pipe 8, the oil outlet pipe 11, and the second conveyor belt device 13 are disposed sequentially in a vertical direction of the furnace body 201 from top to bottom.

In some embodiments, the oil storage tank 10 and the microwave pyrolysis device 4 may be in fluid communication with each other via a connecting device such as a pipe, or the like. The pyrolysis char storage chamber 9 and the microwave pyrolysis device 4 may be in fluid communication with each other via a connecting device such as a conveyor belt device, or the like. The oil storage tank 10 and the pyrolysis char storage chamber 9 transfers the pyrolysis oil and the pyrolysis char to the microwave pyrolysis device 4 through the connecting device, respectively.

In some embodiments, the system may further include a heat-collecting mechanism 14. A heat-collecting end of the heat-collecting mechanism 14 is connected to at least one of the first gas collection pipe 8, the oil outlet pipe 11, and the second conveyor belt device 13. The heat-collecting mechanism 14 is configured to collect thermal energy of the primary combustible gas, the pyrolysis oil, and the pyrolysis char, and supply heat to at least one of the gasifier 2 and the preprocessing chamber 7. The heat-collecting mechanism 14 may a heat exchanger and a heat storage filled with a heat exchange medium. The heat-collecting end refers to a contact end of the heat exchange medium with other structures (e.g., the first gas collection pipe 8, the oil outlet pipe 11, and the second conveyor belt device 13). The heat-collecting mechanism 14 may be any device capable of exchanging heat with the aforementioned structures (e.g., the first gas collection pipe 8, the oil outlet pipe 11, and the second conveyor belt device 13), the no limitation is made herein.

The microwave pyrolysis device 4 is in fluid communication with the gas storage tank 3 via the second gas collection pipe 15, and the heat-collecting end of the heat-collecting mechanism 14 is connected to the second gas collection pipe 15. The heat-collecting mechanism 14 is configured to collect thermal energy of the secondary combustible gas. In some embodiments, the pyrolysis oil and the pyrolysis char, which are easy to exchange heat, may also be input into the heat-collecting mechanism 14 having a heat exchange chamber with sufficient holding space. After exchanging heat, the pyrolysis oil and the pyrolysis char are fed into a corresponding storage mechanism.

The heat-collecting mechanism 14 refers to a device for collecting the thermal energy of the primary combustible gas, the pyrolysis oil, the pyrolysis char, and the secondary combustible gas and supplying heat to at least one of the gasifier 2 and the preprocessing chamber 7. In some embodiments, the heat-collecting mechanism 14 may include the heat exchange chamber and the heat-collecting end.

The heat exchange chamber is a physical space in the heat-collecting mechanism that is configured to accommodate pyrolysis products (e.g., the primary combustible gas, the pyrolysis oil, the pyrolysis char, the secondary combustible gas, etc.) and perform heat exchange, thereby enabling efficient recovery of residual heat from the pyrolysis products.

The heat-collecting end of the heat-collecting mechanism 14 is a thermal energy recovery interface in the heat-collecting mechanism that is in direct contact with high-temperature products, enabling the collection and transfer of the residue heat.

In some embodiments, the heat-collecting end of the heat-collecting mechanism 14 is connected to the first gas collection pipe 8, the oil outlet pipe 11, the second conveyor belt device 13, and the second gas collection pipe 15.

In some embodiments of the present disclosure, the thermal energy of the primary combustible gas, the pyrolysis oil, and the pyrolysis char can be efficiently collected and utilized by providing the heat-collecting mechanism, thereby improving the energy utilization efficiency of the system. The collected thermal energy may be further used to supply heat to the gasifier and the preprocessing chamber, thereby reducing the reliance on external energy sources. In particular, when solar radiation is insufficient, the supplemental heat provided by the heat-collecting mechanism helps maintain normal operation of the system. In addition, the recovery and utilization of the thermal energy reduces the overall energy consumption of the system, improves pyrolysis efficiency, and further enhances the system's economic and environmental performance.

In some embodiments of the present disclosure, the heat-collecting mechanism is configured to supply heat to at least one of the gasifier and the preprocessing chamber, and the thermal power generation unit is configured to supply heat to the gasifier. This configuration not only reduces energy consumption of the preprocessing chamber, but also maintains a temperature inside the gasifier during nighttime, thereby ensuring operational sustainability and minimize frequent start-stop cycles.

In some embodiments of the present disclosure, the microwave pyrolysis device is in fluid communication with the gas storage tank through the second gas collection pipe, and the heat-collecting end of the heat-collecting mechanism is connected to the second gas collection pipe to recover thermal energy released during high-temperature pyrolysis of the secondary combustible gas. Moreover, the large-scale heat exchange chamber enables efficient thermal transfer, so that the system can maximize utilization of the thermal energy of the secondary combustible gas and minimize system heat loss, thereby further enhancing pyrolysis efficiency and environmental performance.

In some embodiments, the gas inlet pipe 204 is provided with a gas regulating device configured to regulate a ratio between the inert gas and the carbon dioxide gas entering into the furnace body 201.

In some embodiments, the inert gas and the carbon dioxide gas are loaded by different cylinders respectively, and a flow valve may be provided at an outlet of each of the cylinders, so that an inlet volume of the inert gas and an inlet volume of the carbon dioxide gas may be regulated uniformly by the gas regulating device to change an atmosphere in the furnace body. A good atmosphere in the furnace body ensures sufficient pyrolysis of the solid waste, thereby improving the gas conversion rate and overall power generation efficiency.

The gas regulating device refers to a device configured to regulate the inlet volume of the inert gas and the inlet volume of the carbon dioxide gas.

In some embodiments, the gas regulating device may regulate the ratio between the inert gas and the carbon dioxide gas entering the furnace body by adjusting an opening degree of the flow valve on the corresponding cylinder. The ratio between the inert gas and the carbon dioxide gas entering the furnace body may be set based on actual demands.

In some embodiments of the present disclosure, by providing the gas regulating device, it is possible to accurately control the ratio between the inert gas and the carbon dioxide gas entering the furnace body, thereby optimizing the atmosphere in the furnace body and improving the pyrolysis efficiency of the solid waste and product quality.

In some embodiments, the system may further include a control center. The microwave pyrolysis device 4 is provided with a gravity sensor, the control center is in signal communication with the gravity sensor. The gravity sensor is configured to monitor a weight of the pyrolysis oil and the pyrolysis char in the microwave pyrolysis device 4 and send the weight of the pyrolysis oil and the pyrolysis char to the control center. The control center is configured to: control the thermal power generation unit 6 to distribute power to the microwave pyrolysis device 4 based on the weight of the pyrolysis oil and the weight of the pyrolysis char, and in response to determining that there is surplus electrical power in the thermal power generation unit 6, control the thermal power generation unit 6 to supply power to at least one of the gasifier 2 and the preprocessing chamber 7 to produce thermal energy.

Figure 3:
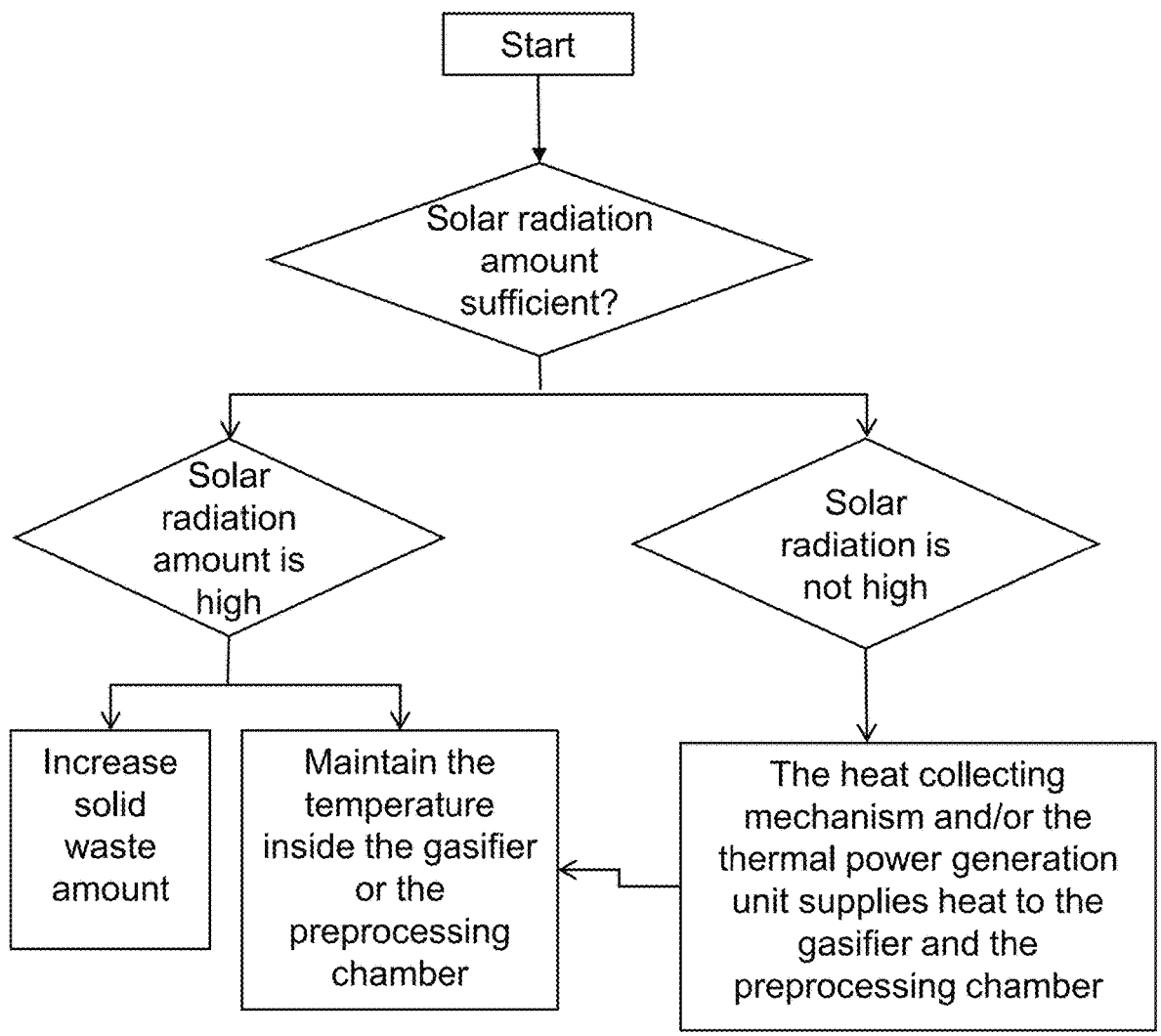
FIG. 3 is a schematic diagram illustrating a working principle of an optical radiation sensor according to some embodiments of the present disclosure.

In some embodiments, an optical radiation sensor is provided on the solar concentrating tower 1, and the optical radiation sensor is in signal communication with the control center. FIG. 3 is a schematic diagram illustrating a working principle of an optical radiation sensor according to some embodiments of the present disclosure. FIG. 3 illustrates the working principle of the optical radiation sensor based on the adequacy of solar radiation. For example, when a light intensity is sufficient, i.e., an amount of solar radiation is too high (e.g., greater than a preset threshold), the heat-collecting mechanism 14 may not need to supply heat to the gasifier 2 or the preprocessing chamber 7, and it is sufficient to maintain the temperature inside the gasifier 2 or the preprocessing chamber 7. At this time, the system may increase an amount of the solid waste. When the light intensity is insufficient, i.e., the amount of solar radiation is not high (e.g., not greater than the preset threshold), at least one of the heat-collecting mechanism 14 and the thermal power generation unit may supply heat to the gasifier 2 and the preprocessing chamber 7 to maintain a pyrolysis function of the gasifier 2 and a preheating and drying function of the preprocessing chamber 7.

The gravity sensor refers to a device configured to measure a weight of the pyrolysis oil and the pyrolysis char in the microwave pyrolysis device.

In some embodiments, the gravity sensor may monitor the weight (i.e., a total weight) of the pyrolysis oil and the pyrolysis char in the microwave pyrolysis device in real time. The control center determines required electrical energy based on weight data and dynamically adjusts a power distribution for the thermal power generation unit. For example, the greater the weight is, the higher a microwave power level is required for pyrolysis.

In some embodiments, the control center may determine whether the thermal power generation unit has redundant power. For example, the control center may identify redundant power during off-peak electricity demand periods and allocate surplus power to the gasifier to maintain its heating or stirring function.

In some embodiments of the present disclosure, the collaborative operation of the gravity sensor and the control center enables the quantification of pyrolysis demand through the weight data, thereby avoiding power overload or inefficient operation. Additionally, flexible dispatching based on redundant power (e.g., supplying power to the gasifier) enhances the system's peak-shaving capability.

In some embodiments of the present disclosure, the integration of solid waste treatment with the thermal power generation unit requires the thermal power generation unit to operate at a mandatory low load during the off-peak electricity demand periods. In this scenario, the redundant power from the thermal power generation unit can be utilized for solid waste treatment, allowing the thermal power generation unit to maintain a sufficiently high operational load and avoid instability or flameout issues commonly associated with low-load operation. During peak electricity demand periods, the combustible gas produced from solid waste treatment is used for power generation, reducing the load on the thermal power generation unit and thereby achieving valley filling and peak shaving.

In some embodiments, the system further include a fuel cell station 5. The gas storage tank 3 delivers the primary combustible gas and the secondary combustible gas to the fuel cell station 5. During peak electricity demand periods, the combustible gas (e.g., the primary combustible gas and secondary combustible gas) is fully combusted in the fuel cell station 5, generating steam to drive a steam turbine for power generation.

The fuel cell station 5 refers to a device that generates electricity by combusting gas (e.g., the primary combustible gas and the secondary combustible gas). In some embodiments, the gas storage tank 3 may deliver the primary combustible gas and the secondary combustible gas to the fuel cell station 5 via a pipeline.

In some embodiments of the present disclosure, efficient pyrolysis of the solid waste and gradient utilization of energy are achieved by integrating the solar concentrating tower, the gasifier, the microwave pyrolysis device, and the thermal power generation unit. The solar concentrating tower supplies heat to the gasifier and the preprocessing chamber, and the microwave pyrolysis device utilizes redundant electrical energy for secondary pyrolysis, which improves gas production and quality. The system consumes redundant electrical energy in off-peak electricity demand periods and utilizes gas to generate electricity in the peak electricity demand periods, thereby achieving valley filling and peak shaving. In addition, the system converts gas to electricity through the fuel cell station, thereby improving energy efficiency and economic performance.

In some embodiments, the system for peak shaving with coupled surplus energy utilization and solid waste treatment operates as follows:

During daytime, the solar concentrating tower 1 absorbs solar energy and generates heat through the heat absorber. The solid waste is first sent to the preprocessing chamber 7, and the heat absorber supplies heat to the preprocessing chamber 7 to generate a preheating temperature in a range from 100 to 200° C., which evaporates moisture in the solid waste, and the solid waste is dried. The dried solid waste is transported to the gasifier 2 via the first conveyor belt device.

The heat absorber supplies heat to the gasifier 2, and the gasifier 2 undergoes first-stage pyrolysis of the solid waste at a temperature of 500° C. During pyrolysis, the stirring device 202 ensures uniform heating for approximately 1 hour. The pyrolyzed solid waste is converted into the primary combustible gas, the pyrolysis oil, and the pyrolysis char, wherein the primary combustible gas is in the uppermost layer, the pyrolysis oil is in the intermediate layer, and the pyrolysis char is in the lowermost layer. The primary combustible gas is directly collected into the gas storage tank 3 through the first gas collection pipe 8, and the pyrolysis oil and the pyrolysis char are respectively collected into the oil storage tank 10 and the pyrolysis char storage chamber 9. During the transfer of the pyrolysis oil and the pyrolysis char into the corresponding collection device, the temperature of the primary combustible gas, the pyrolysis oil, and the pyrolysis char is still above 400° C., and the thermal energy of the primary combustible gas, the pyrolysis oil and the pyrolysis char is collected at the heat-collecting end of the heat-collecting mechanism 14 through heat exchange.

During nighttime, electricity demand is greatly reduced and the thermal power generation unit 6 is forced to reduce its load. In order to ensure that the thermal power generation unit 6 maintains a safe load, the pyrolysis oil and the pyrolysis char are mixed (a ratio between the pyrolysis oil and the pyrolysis char is not limited) and placed into the microwave pyrolysis device 4, and redundant power is supplied to the microwave pyrolysis device 4 by the thermal power generation unit 6 to pyrolyze the pyrolysis oil and the pyrolysis char at a temperature of 1000° C. for about 0.5 hours. The pyrolysis char and the pyrolysis oil are completely pyrolyzed to form the secondary combustible gas, which is collected through the second gas collection pipe 15 into the gas storage tank 3. The secondary combustible gas remains at a temperature above 900° C., and the heat-collecting end of the heat-collecting mechanism 14 collects the thermal energy of the secondary combustible gas through heat exchange.

During the peak electricity demand periods, the combustible gas is delivered to the fuel cell station 5 through the gas storage tank 3 to generate electricity, which reduces the load on the thermal power generation unit and achieves valley filling and peak shaving.

In the above process, when the light intensity is sufficient, the heat-collecting mechanism 14 may not need to supply heat to the gasifier 2 or the preprocessing chamber 7; when the light intensity is insufficient, the heat-collecting mechanism 14 supplies heat to the gasifier 2 or the preprocessing chamber 7 to maintain the pyrolysis function of the gasifier 2 and the preheating and drying functions of the preprocessing chamber 7, thereby fully utilizing thermal energy storage of the heat-collecting mechanism 14 and thermal energy storage generated by the solar concentrating tower 1.

In the above process, since the solar concentrating tower 1 may not work during the nighttime, in addition to the heat-collecting mechanism 14 supplying heat to the gasifier 2 and the preprocessing chamber 7, redundant power from the thermal power generation unit 6 may also be utilized to supply power to the gasifier 2 and the preprocessing chamber 7 to generate heat, thereby maximizing off-peak electricity utilization.

A total duration for complete pyrolysis of the solid waste using the system provided in the embodiments of present disclosure is 1.5 hours, and a total duration for complete pyrolysis of the solid waste by conventional single-stage microwave pyrolysis is more than 2 hours. Compared to the conventional approach, the system provided in and the present disclosure not only reduces the pyrolysis duration, but also lowers energy consumption.

Some features, structures, or characteristics of one or more embodiments of the present disclosure may be suitably combined.

In the description of the present disclosure, it is to be understood that the terms "vertical", "horizontal", "up", "down", "front", "back", "left", "right", "longitudinal", "transverse", "top", "bottom," "inner," "outer," or the like, indicate orientation or positional relationships based on those shown in the accompanying drawings. These terms are used solely to facilitate the description of the present disclosure, and do not imply that the referenced device or component must have a specific orientation or be constructed/operated in a specific manner. Thus, the terms should not be construed as limiting the scope of the present disclosure.

The above-described embodiments are only descriptions of the preferred manner of the present application, and are not intended to limit the scope of the present application. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

What is claimed is:

1. A system for peak shaving with coupled surplus energy utilization and solid waste treatment, comprising:
   a solar concentrating tower provided with a heat absorber;
   a gasifier, the heat absorber supplying heat to the gasifier, and the gasifier being configured to pyrolyze solid waste into primary combustible gas, pyrolysis oil, and pyrolysis char;
   a gas storage tank in fluid communication with the gasifier and configured to collect the primary combustible gas;
   a tar storage mechanism in fluid communication with the gasifier and configured to store the pyrolysis oil and the pyrolysis char;
   a microwave pyrolysis device, wherein
      a feed end of the microwave device is in fluid communication with the tar storage mechanism,
      the microwave pyrolysis device is powered by a thermal power generation unit,
      the microwave pyrolysis device is configured to pyrolyze the pyrolysis oil and the pyrolysis char into secondary combustible gas, and the secondary combustible gas is collected into the gas storage tank;
   a preprocessing chamber, wherein
      the heat absorber supplies heat to the preprocessing chamber,
      the preprocessing chamber preheats the solid waste at a temperature in a range from 100° C. to 200° C., and
      preheated solid waste is transferred by a first conveyor belt device to the gasifier;
   wherein the gasifier includes:
      a furnace body, a side of the furnace body is provided with a feed opening connected to the first conveyor belt device;
      a stirring device provided at a bottom of the gasifier;
      a heating assembly disposed on an inner surface of the gasifier and heated by the heat absorber; and
      a gas inlet pipe in fluid communication with the furnace body and configured to deliver inert gas and carbon dioxide gas into the furnace body;
   wherein:
      the solid waste is pyrolyzed in the furnace body into the primary combustible gas, the pyrolysis oil, and the pyrolysis char, which are sequentially distributed from top to bottom;
      a first gas collection pipe is provided in a region of the furnace body where the primary combustible gas is distributed, and the first gas collection pipe is in fluid communication with the gas storage tank, and
      a tar collection mechanism is provided in a region of the furnace body where the pyrolysis oil and the pyrolysis char are distributed, the tar collection mechanism is in fluid communication with the tar storage mechanism;

wherein the tar storage mechanism includes a pyrolysis char storage chamber and an oil storage tank, the tar collection mechanism includes an oil outlet pipe and a second conveyor belt device, the oil outlet pipe is configured to collect the pyrolysis oil from the furnace body to the oil storage tank, the second conveyor belt device is configured to collect the pyrolysis char from the furnace body to the pyrolysis char storage chamber; the pyrolysis char storage chamber and the oil storage tank are in fluid communication with the microwave pyrolysis device; and the system further comprising: a fuel cell station, wherein the gas storage tank transfers the primary combustible gas and the secondary combustible gas to the fuel cell station.

2. The system of claim 1, wherein a pyrolysis temperature of the gasifier is in a range from 500° C. to 600° C., and a pyrolysis temperature of the microwave pyrolysis device is in a range from 1000° C. to 1100° C.

3. The system of claim 1, further comprising a heat-collecting mechanism, wherein:

a heat-collecting end of the heat-collecting mechanism is connected to at least one of the first gas collection pipe, the oil outlet pipe, and the second conveyor belt device; and the heat-collecting mechanism is configured to collect thermal energy of the primary combustible gas, the pyrolysis oil, and the pyrolysis char, and supply heat to at least one of the gasifier and the preprocessing chamber.

4. The system of claim 3, wherein the microwave pyrolysis device is in fluid communication with the gas storage tank through a second gas collection pipe, the heat-collecting end of the heat-collecting mechanism is connected to the second gas collection pipe, and the heat-collecting mechanism is configured to collect thermal energy of the secondary combustible gas.

5. The system of claim 1, wherein the gas inlet pipe is provided with a gas regulating device configured to regulate a ratio between the inert gas and the carbon dioxide gas entering into the furnace body.

6. The system of claim 1, further comprising a control center, wherein the microwave pyrolysis device is provided with a gravity sensor, the control center is in signal communication with the gravity sensor, the gravity sensor is configured to monitor a weight of the pyrolysis oil and the pyrolysis char in the microwave pyrolysis device and send the weight of the pyrolysis oil and the pyrolysis char to the control center, the control center is configured to:

control the thermal power generation unit to distribute power to the microwave pyrolysis device based on the weight of the pyrolysis oil and the weight of the pyrolysis char; and in response to determining that there is surplus electrical power in the thermal power generation unit, control the thermal power generation unit to supply power to the gasifier to produce thermal energy.

* * * * *